United States Patent
Luo

(10) Patent No.: US 7,986,941 B2
(45) Date of Patent: Jul. 26, 2011

(54) MOBILE COMMUNICATION DEVICE WITH SILENT CONVERSATION CAPABILITY

(75) Inventor: Hui Luo, Marlboro, NJ (US)

(73) Assignee: Broadcom Corporation, Irvine, CA (US)

( * ) Notice: Subject to any disclaimer, the term of this patent is extended or adjusted under 35 U.S.C. 154(b) by 47 days.

(21) Appl. No.: 11/146,603

(22) Filed: Jun. 7, 2005

(65) Prior Publication Data

US 2006/0274682 A1 Dec. 7, 2006

(51) Int. Cl.
*H04L 12/58* (2006.01)
*H04M 1/725* (2006.01)

(52) U.S. Cl. .............. 455/412.1; 455/413; 455/414.4; 370/259; 370/310

(58) Field of Classification Search .......... 370/310, 370/252, 259, 465; 455/412.1, 413, 414.4
See application file for complete search history.

(56) References Cited

U.S. PATENT DOCUMENTS

| | | | | |
|---|---|---|---|---|
| 5,153,905 | A * | 10/1992 | Bergeron et al. | 379/88.23 |
| 5,711,011 | A * | 1/1998 | Urs et al. | 455/520 |
| 6,275,690 | B1 * | 8/2001 | Higuchi et al. | 455/412.2 |
| 6,631,274 | B1 * | 10/2003 | Keshavachar | 455/466 |
| 6,781,962 | B1 * | 8/2004 | Williams et al. | 370/259 |
| 7,519,049 | B2 * | 4/2009 | Masuda | 370/352 |
| 2002/0181671 | A1 * | 12/2002 | Logan | 379/88.13 |
| 2004/0078104 | A1 * | 4/2004 | Nguyen et al. | 700/94 |
| 2005/0180338 | A1 * | 8/2005 | Pirila et al. | 370/252 |

FOREIGN PATENT DOCUMENTS

| | | |
|---|---|---|
| CN | 1198069 | 11/1998 |
| GB | 2 389 480 | 12/2003 |
| WO | 01/17275 | 3/2001 |

OTHER PUBLICATIONS

European Search Report corresponding to European Patent Application No. 06004148.0/1246, dated Nov. 25, 2009.

* cited by examiner

*Primary Examiner* — Tuan H Nguyen
(74) *Attorney, Agent, or Firm* — McAndrews, Held & Malloy, Ltd.

(57) ABSTRACT

A system and method for providing silent conversation capability in a mobile communication device. Various aspects of the present invention may comprise establishing a wireless communication link between the mobile communication device and a second communication device. A user input may be received at the mobile communication device. A voice message may be determined from a plurality of voice messages based, at least in part, on the user input. Such determination may, for example, comprise selecting a voice message from a plurality of prerecorded voice messages and/or determining a voice message to be synthesized. The determined voice message may then be communicated to the second communication device. For example, the determined voice message may be communicated to the second communication device in such a way that people in the proximity of the mobile communication device might not hear the determined voice message.

27 Claims, 5 Drawing Sheets

MOBILE COMMUNICATION DEVICE WITH SILENT CONVERSATION CAPABILITY

BACKGROUND OF THE INVENTION

Mobile communication devices are continually increasing in popularity. Such mobile communication devices include, for example and without limitation, cellular phones, paging devices and personal digital assistants. Mobile communication devices provide the user with the capability to conduct communications in a large variety of environments, some of which may not be appropriate for certain types of communications (e.g., voice communications). As a non-limiting example, it is generally inappropriate to conduct telephone conversations in quiet areas (e.g., a movie theater during a movie, in a conference room during a meeting, in a church during a service, etc.). Also for example, it may occasionally be difficult or impossible to conduct telephone conversations in noisy environments (e.g., at a sporting event, at a construction area, at a noisy nightclub, etc.).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing silent conversation capability in a mobile communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
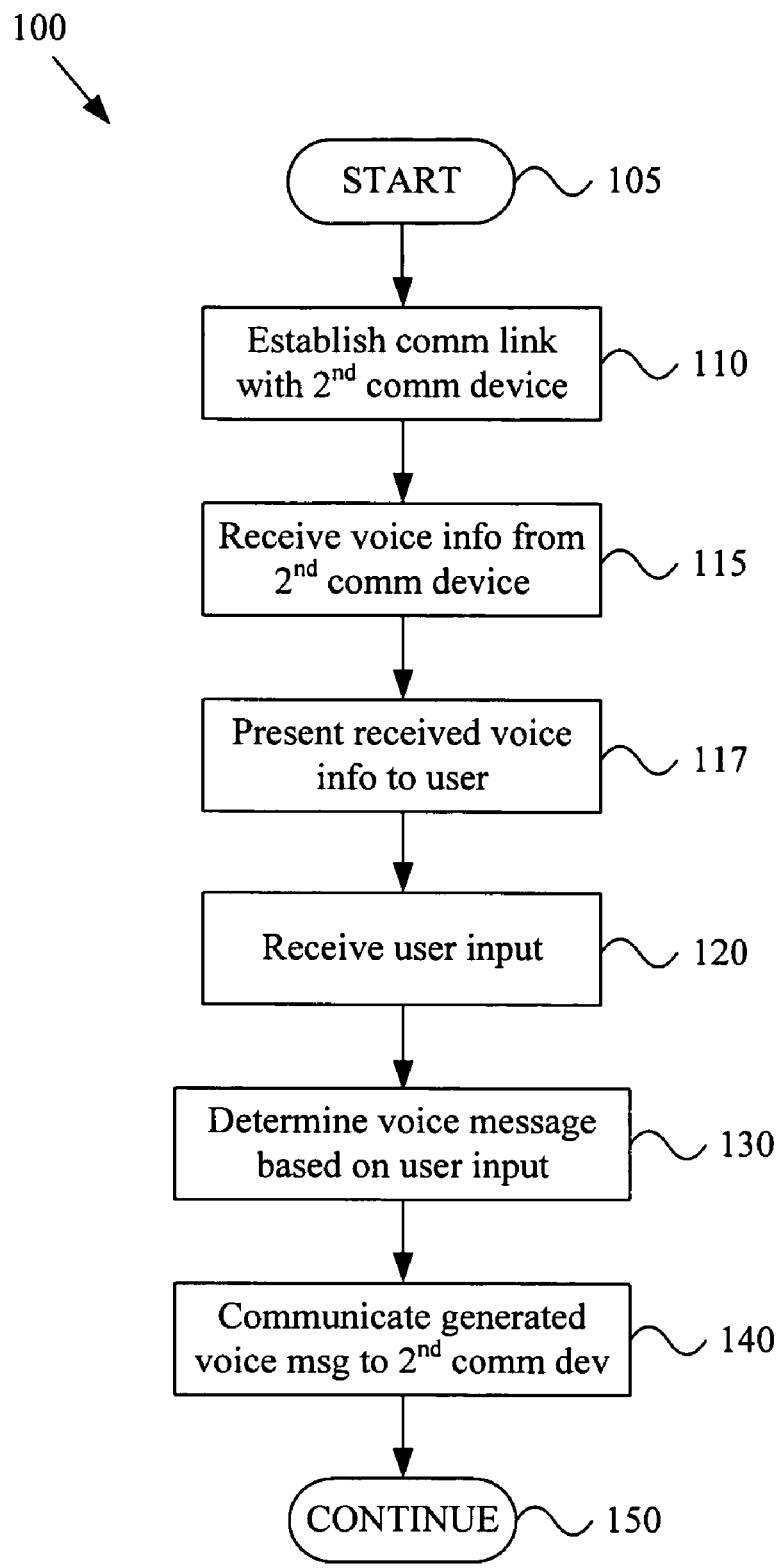
FIG. 1 is a diagram illustrating a method, in a mobile communication device, for providing silent conversation capability, in accordance with various aspects of the present invention.

FIG. 1 is a diagram illustrating a method 100, in a mobile communication device, for providing silent conversation capability, in accordance with various aspects of the present invention. The mobile communication device may comprise characteristics of any of a variety of mobile communication device types. For example and without limitation, the mobile communication device may comprise characteristics of a cellular telephone. Also for example, the mobile communication device may comprise characteristics of a voice-capable paging device, voice-capable portable email device, voice-capable personal digital assistant (PDA) or pocket computer with mobile communication capability, etc. Accordingly, the scope of various aspects of the present invention should not be limited by characteristics of any particular type of mobile communication device.

The exemplary method 100 may begin executing at step 105. The exemplary method 100 may begin executing for any of a variety of reasons. For example and without limitation, the exemplary method 100 may begin executing upon power-up or reset of a mobile communication device implementing the exemplary method 100. Also for example, the exemplary method 100 may begin executing in response to a user command to begin (e.g., a command to initiate a communication or respond to a communication). Further for example, the exemplary method 100 may begin executing in response to a signal received at the mobile communication device from another communication device. Accordingly, the scope of various aspects of the present invention should not be limited by characteristics of any particular initiating cause or condition.

The exemplary method 100 may, at step 110, comprise establishing a communication link (e.g., a wireless communication link) with a second communication device. The second communication device may comprise characteristics of any of a variety of communication devices. For example and without limitation, the second communication device may comprise characteristics of a cellular telephone, portable telephone or wired telephone. Also for example, the second communication device may comprise characteristics of a voice-capable paging device, voice-capable portable email device, voice-capable personal digital assistant (PDA) or pocket computer with mobile communication capability, etc. Accordingly, the scope of various aspects of the present invention should not be limited by characteristics of any particular type of second communication device.

The communication link may comprise characteristics of any of a variety of types of communication links. For example and without limitation, the communication link may comprise characteristics of a cellular telephone communication link. Also for example, the communication link may comprise characteristics of any of a large variety of telecommunication and/or computer communication links. The communication link may further, for example, comprise characteristics of any of a variety of communication media (e.g., wireless RF, non-tethered optical, etc.).

The communication link may additionally, for example, be capable of communicating voice information and any of a variety of other information types. For example and without limitation, the communication link may be capable of communicating video, graphical, pictorial, data and/or textual information.

Step 110 may, for example, comprise establishing the communication link in accordance with any of a variety of communication protocols and/or standards. For example and without limitation, step 110 may comprise establishing the communication link in accordance with any of a variety of cellular telecommunication protocols and/or standards (e.g., GSM, GPRS, EDGE, HSCSD, CDMA, WCDMA, TDMA, PDC, SMS, etc.). Also for example, step 110 may comprise establishing the communication link in accordance with any of a variety of computer communication protocols and/or standards (e.g., WLAN, WiFi, IEEE 802.11, IEEE 802.15, Bluetooth, UltraWideBand, Zigbee, IP, Ethernet or IEEE 802.3, X.25, token ring or IEEE 802.5, etc.).

In general, step 110 may comprise establishing a communication link with a second communication device. Accordingly, the scope of various aspects of the present invention should not be limited by characteristics of any particular type of second communication device, any particular type of communication link, or any particular manner of establishing a communication link.

Note that though the present discussion will generally refer to communication between the mobile communication device and a second communication device, such a one-to-one correspondence is merely illustrative. The scope of various aspects of the present invention should not be limited by any particular number of communication devices with which the mobile communication device may communicate.

The exemplary method 100 may, at step 115, comprise receiving voice communication information from the second communication device (e.g., over the communication link established at step 110). For example and without limitation, step 115 may comprise receiving voice communication information corresponding to a second person utilizing the second communication device to speak to the user of the mobile communication device.

The exemplary method 100 may, at step 117, comprise communicating at least a portion of the received voice information to the user (e.g., in a substantially silent manner from the perspective of people other than the user of the mobile communication device). For example, step 117 may comprise generating an audio output corresponding to the received voice information at an ear speaker, earphone, headset or other audio output device such that the generated audio output may be presented to a user of the mobile communication device without being audible to other people in the proximity of the mobile communication device. Such presentation of incoming voice information may provide voice information to a user of the mobile communication device without causing noise interference to others.

The exemplary method 100 may, at step 120, comprise receiving a user input (e.g., from a person utilizing the mobile communication device to communicate). The user input may comprise characteristics of any of a variety of user inputs. For example and without limitation, the user input may comprise a key press signal (e.g., associated with a key press on a numeric or alpha-numeric keypad). Also for example, the user input may comprise a signal indicative of a user touch screen selection. Further for example, the user input may comprise a signal indicative of cursor movement and/or selection (e.g., a touch pad, thumbwheel, arrow key, select button, etc.). The scope of various aspects of the present invention should not be limited by characteristics of a particular type of user input that may be received at a mobile communication device.

Step 120 may comprise receiving a user input in any of a variety of manners. For example and without limitation, step 120 may comprise passively receiving an input from a user. Also for example, step 120 may comprise actively soliciting an input from a user. For example, step 120 may comprise generating a visual output (e.g., a menu) identifying a set of voice messages from which the user is to choose. Such voice messages may, for example, comprise prerecorded voice messages (e.g., characterized by a generic voice or the user's voice). For example, the prerecorded voice messages may correspond to a set of voice messages prerecorded by the user with the user's voice.

A menu of voice messages (e.g., a visual menu) may comprise characteristics of any of a variety of menu types. For example, a menu may comprise keywords or icons associated with particular words or voice messages. Also for example, a menu may comprise key letters, numbers or other symbols associated with particular words or voice messages. Such keywords, symbols, letters, numbers or other symbols may be a predefined set or may, for example, be definable (e.g., user selectable or designable).

In various non-limiting exemplary scenarios, step 120 may comprise associating one of a plurality of sets of prerecorded voice messages with a particular communication. For example, a first set of prerecorded voice messages may comprise messages recorded in a first language, and a second set of prerecorded voice messages may comprise messages recorded in a second language. In another example, a first set of prerecorded voice messages may comprise messages recorded for professional conversations, and a second set of prerecorded voice messages may comprise messages recorded for personal conversations. In yet another example, a first set of prerecorded voice messages may comprise messages recorded for conversations with a first person (or first group of people), and a second set of prerecorded voice messages may comprise messages recorded for conversations with a second person (or second group of people).

In a non-limiting exemplary scenario where there is such a plurality of sets of prerecorded voice messages, step 120 may comprise associating one of the plurality of sets of prerecorded voice messages with a particular communication in any of a variety of manners. For example and without limitation, step 120 may comprise associating a set of prerecorded voice messages with a particular communication based, at least in part, on the identity of the second communication device or a user thereof. Also for example, step 120 may comprise associating a set of prerecorded voice messages with a particular communication based, at least in part, on a user input (e.g., acquired at step 120 or another step) indicating a user selection of a particular set. Further for example, step 120 may comprise associating a set of prerecorded voice messages with a particular communication based, at least in part, on date, time, geographical location, present user of the mobile communication device, etc. In general, in various non-limiting exemplary scenarios, step 120 may comprise associating one of a plurality of sets of prerecorded voice messages with a particular communication. Accordingly, the scope of various aspects of the present invention should not be limited by characteristics of any particular set of prerecorded voice messages or any particular manner of associating a particular set of prerecorded voice messages with a particular communication.

In general, step 120 may comprise receiving a user input. Accordingly, the scope of various aspects of the present invention should not be limited by characteristics of any particular user input, any particular manner of receiving a user input or any particular manner of interacting with a user to receive a user input.

The exemplary method 100 may, at step 130, comprise determining, based at least in part on the user input (e.g., as received at step 120), a voice message from a plurality of voice messages (e.g., to communicate to the second communication device with which a communication link was established at step 110).

Step 130 may comprise determining a voice message in any of a variety of manners. For example and without limitation, step 130 may comprise selecting, based at least in part on a user input (e.g., as received at step 120), a voice message from a set of voice messages. Such voice messages may, for example, comprise prerecorded voice messages (e.g., recorded in a generic voice or in the user's voice). A set of prerecorded voice messages may, for example, comprise a fundamental (e.g., logically complete) set of statements with which one side of a basic two-sided conversation may be conducted. For example and without limitation, a set of prerecorded voice messages may comprise statements, such as: "yes," "no," "maybe," "I can't talk now, but I'm listening," "I will call you as soon as I can," "I understand," "please leave a short message, to which I can respond with short prerecorded messages," "later," "tomorrow," "call someone else," "use your best judgment," "please hold while I move to a more appropriate location," "I have to hang up now," "please continue," "hello," "good-bye," "thank you," "please repeat," "please wait while a type an answer," etc.

Step 130 may also, for example, comprise determining a voice message by determining a voice message to be synthesized based, at least in part, on a user input (e.g., as received at step 120). For example and without limitation, step 130 may comprise determining, based at least in part on a user input, a voice message to be synthesized by performing text-to-speech or phonics-to-speech synthesis. The user may, for example at step 120, spell a word or phrase or phonetically construct a pronunciation for a word or phrase, and step 130 may then comprise determining the word or phrase to be synthesized based, at least on part, on the input spelling or phonetic representation.

In a non-limiting exemplary scenario, step 130 may comprise generating an audio output indicative of the determined voice message. For example, step 130 may comprise presenting such an audio output to a user of the mobile communication device through an ear speaker, earpiece, headset or other audio output device such that people in the proximity of the mobile communication device will not hear the audio output, or in a manner that will be minimally affected by external sound noise at the user's locale. A user may thus hear the determined voice message. For example and without limitation, step 130 may comprise generating an audio output corresponding to the determined voice message and providing the user an opportunity to confirm the determined voice message or specify that an alternative voice message be determined prior to the determined voice message being communicated to the second communication device (e.g., at step 140, discussed below). Also for example, step 130 may comprise generating an audio output corresponding to the determined voice message concurrently with the communication of the determined voice message to the second communication device. In an exemplary scenario where the determined voice message is output to the user, step 130 may comprise mixing the determined voice message with other audio that may be provided to the user (e.g., audio associated with an incoming voice signal from the second communication device).

In general, step 130 may comprise determining a voice message from a plurality of voice messages based, at least in part, on a user input (e.g., as received at step 120). Accordingly, the scope of various aspects of the present invention should not be limited by characteristics of any particular manner of determining a voice message (e.g., selecting from a set or determining a voice message to be synthesized) or any particular manner of providing feedback to a user to notify the user of a determined voice message.

The exemplary method 100 may, at step 140, comprise communicating the determined voice message (e.g., as determined at step 130) to the second communication device over a communication link (e.g., as established at step 110). Step 140 may comprise communicating the determined voice message to the second communication device in any of a variety of manners (e.g., depending on the nature of the second communication device and/or the communication link established with the second communication device). As discussed previously with regard to step 110, the second communication device may comprise characteristics of any of a variety of communication device types, and the communication link may comprise characteristics of any of a large variety of types of communication links. Accordingly, the scope of various aspects of the present invention should not be limited by characteristics of any particular manner of communicating a voice message.

Step 140 may for example and without limitation, comprise generating an audio signal corresponding to the determined voice message. Step 140 may, for example, comprise performing such generating in any of a plurality of manners. For example and without limitation, step 140 may comprise retrieving voice message information (e.g., digitally sampled voice message information) corresponding to a determined voice message from memory and processing such retrieved voice message information to generate an audio signal. Also for example, step 140 may comprise performing any of a variety of voice synthesis techniques (e.g., text or phonics based voice synthesis techniques) to generate an audio signal. The scope of various aspects of the present invention should not be limited by characteristics of any particular manner of generating an audio signal.

Step 140 may, for example and without limitation, comprise selecting between a voice signal originated at a microphone of the mobile communication device and a generated voice signal (e.g., corresponding to the voice message determined at step 130) and transmitting the selected voice signal. Step 140 may alternatively, for example, comprise mixing a voice signal originated at a microphone of the mobile communication device and a generated voice signal (e.g., corresponding to the voice message determined at step 130) and transmitting the selected voice signal. In general, step 140 may comprise communicating the determined voice message (e.g., as determined at step 130) to at least the second communication device. Accordingly, the scope of various aspects of the present invention should not be limited by characteristics of any particular manner of communicating the determined voice message.

The exemplary method 100 may, at step 150, comprise performing continued processing activities. Step 150 may comprise performing any of a large variety of processing activities. Such processing activities may, for example and without limitation, comprise those generally associated with mobile communication.

For example, step 150 (or another step) may comprise interfacing with a user to define a set of voice messages. Such interfacing may, for example, comprise interfacing with a user to record one or more prerecorded voice messages. Also for example, such interfacing may comprise defining visible indicia (e.g., text, icons, numbers, etc.) to represent various prerecorded voice messages on an output display of the mobile communication device.

Also for example, in a non-limiting exemplary scenario including a plurality of sets of prerecorded voice messages, step 150 (or another step) may comprise interfacing with a user to define a plurality of sets of voice messages. Such interfacing may, for example, comprise interfacing with a user to associate a particular set of voice messages with one or more particular selection characteristics (e.g., user input, communication device ID, caller ID, user ID, language, date, time, location, etc.). Such an association may then, for example, be utilized to associate a particular set of voice messages with a particular communication.

Note that various portions of such interfacing may be performed by the mobile communication device or may be performed by another device (e.g., a personal computer) that may be coupled to the mobile communication device.

Step 150 may also, for example, comprise receiving a user input (e.g., a "mode" input) associated with setting or changing operation of the mobile communication device between a silent communication mode (e.g., communicating in accordance with steps 115-140) and a non-silent communication mode (e.g., where the user speaks normally into the mobile communication device) and vice-versa. Step 150 may then, for example, comprise switching between a silent and non-silent communication mode based on such a received user input. In a non-limiting exemplary scenario, such switching may comprise communicating a message to another communication device indicating that such a mode switch has occurred.

Step 150 may also, for example, comprise receiving a signal (e.g., a "mode" signal) from another communication device associated with setting or changing operation of the mobile communication device between a silent communication mode (e.g., communicating in accordance with steps 120-140) and a non-silent communication mode (e.g., where the user speaks normally into the mobile communication device). Step 150 may then, for example, comprise switching between a silent and non-silent communication mode based on such a received signal.

Step 150 may further, for example, comprise communicating various information, in addition to voice information, between the mobile communication device and the second communication device. For example and without limitation, step 150 may comprise communicating video information and/or textual information between the mobile communication device and the second communication device. For example, step 150 may comprise interfacing with the user to enter an operating mode in which the user may utilize the mobile communication device to communicate alphanumeric characters (or audible representations thereof) with the second communication device. Further for example, step 150 may comprise communicating data information (e.g., file information) with the second communication device.

Step 150 may additionally, for example, comprise receiving a second user input and, in response to the second user input, abort communicating the determined voice message to another communication device at step 140. In a non-limiting exemplary scenario, a user may determine that an incorrect or unnecessarily long message is being communicated at step 140 and enter the second user input to discontinue transmission of the errant or unnecessarily long message. Execution of the exemplary method 100 may, for example, return to step 120 to receive additional user input.

In general, step 150 may comprise performing any of a large variety of continued processing activities. Accordingly, the scope of various aspects of the present invention should not be limited by characteristics of any particular type of continued processing.

The exemplary method 100 was presented to provide specific illustrations of various generally broader aspects of the present invention. Accordingly, the scope of various aspects of the present invention should not be limited by characteristics of the exemplary method 100.

Figure 2:
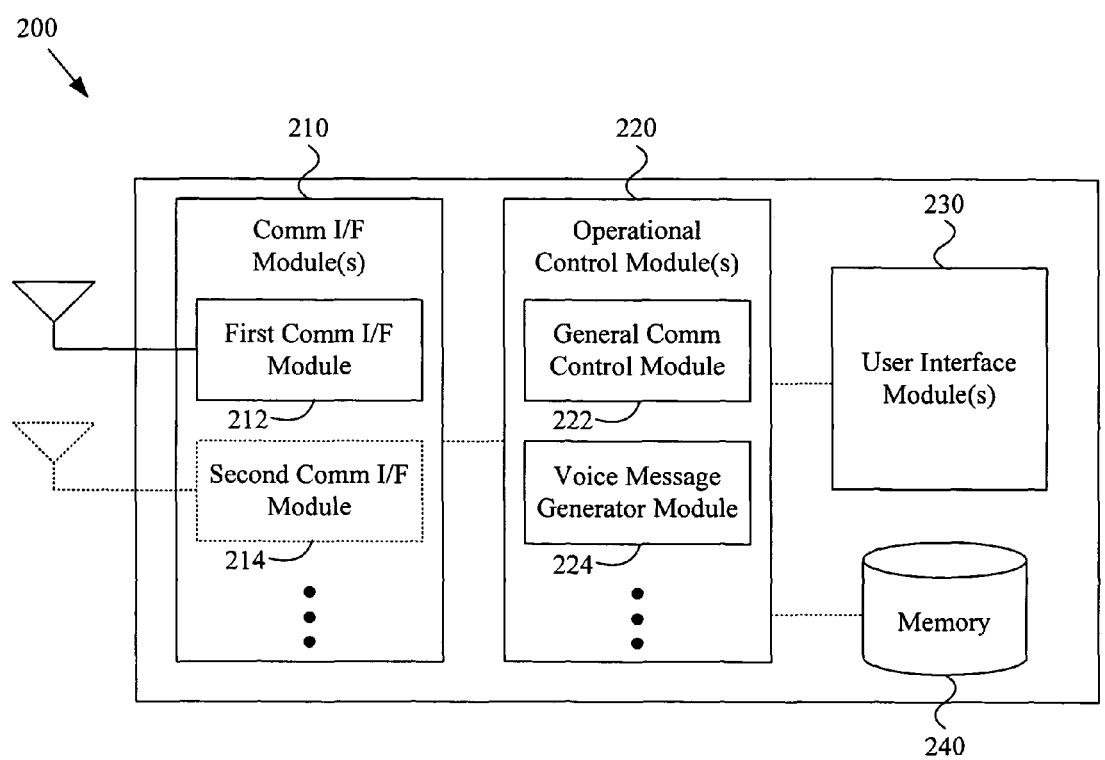
FIG. 2 is a diagram illustrating a mobile communication device that provides silent conversation capability, in accordance with various aspects of the present invention.

FIG. 2 is a diagram illustrating a mobile communication device 200 that provides silent conversation capability, in accordance with various aspects of the present invention. The mobile communication device 200 may, for example and without limitation, share various functional characteristics with the exemplary method 100 illustrated in FIG. 1 and discussed previously.

The mobile communication device 200 may comprise characteristics of any of a variety of mobile communication device types. For example and without limitation, the mobile communication device may comprise characteristics of a cellular telephone. Also for example, the mobile communication device 200 may comprise characteristics of a voice-capable paging device, voice-capable portable email device, voice-capable personal digital assistant (PDA) or pocket computer with mobile communication capability, etc. Accordingly, the scope of various aspects of the present invention should not be limited by characteristics of any particular type of mobile communication device.

The exemplary mobile communication device 200 may comprise one or more communication interface modules 210, one or more operational control modules 220, one or more user interface modules 230 and a memory 240. The communication interface module(s) 210 may, for example, comprise a first communication interface module 212 and a second communication interface module 214. The operational control module 220 may, for example, comprise a general communication control module 222 and a voice message generator module 224. Various non-limiting aspects of the previously mentioned modules will now be discussed.

The exemplary mobile communication device 200 may comprise a first communication interface module 212. The first communication interface module 212 may comprise characteristics of any of a variety of communication interface modules. For example and without limitation, the first communication interface module 212 may share various functional characteristics with step 110 of the exemplary method 100 illustrated in FIG. 1 and discussed previously.

For example, the first communication interface module 212 may be adapted to establish a communication link (e.g., a wireless communication link) with at least a second communication device. The second communication device may comprise characteristics of any of a variety of communication devices. For example and without limitation, the second communication device may comprise characteristics of a cellular telephone, portable telephone or wired telephone. Also for example, the second communication device may comprise characteristics of a voice-capable paging device, voice-capable portable email device, voice-capable personal digital assistant (PDA) or pocket computer with mobile communication capability, etc. Accordingly, the scope of various aspects of the present invention should not be limited by characteristics of any particular type of second communication device.

The communication link may comprise characteristics of any of a variety of types of communication links. For example and without limitation, the communication link may comprise characteristics of a cellular telephone communication link. Also for example, the communication link may comprise characteristics of any of a large variety of telecommunication and/or computer communication links. The communication link may further, for example, comprise characteristics of any of a variety of communication media (e.g., wireless RF, non-tethered optical, etc.)

The communication link may additionally, for example, be capable of communicating voice information and any of a variety of other information types. For example and without limitation, the communication link may be capable of communicating video, graphical, pictorial, data and/or textual information.

The first communication interface module 212 may, for example, be adapted to establish the communication link in accordance with any of a variety of communication protocols and/or standards. For example and without limitation, the first communication interface module 212 may be adapted to establish the communication link in accordance with any of a variety of cellular telecommunication protocols and/or standards (e.g., GSM, GPRS, EDGE, HSCSD, CDMA, WCDMA, TDMA, PDC, SMS, etc.). Also for example, the first communication interface module 212 may be adapted to establish the communication link in accordance with any of a variety of computer communication protocols and/or standards (e.g., WLAN, WiFi, IEEE 802.11, IEEE 802.15, Bluetooth, UltraWideBand, Zigbee, IP, Ethernet or IEEE 802.3, X.25, token ring or IEEE 802.5, etc.).

In general, the first communication interface module 212 may be adapted to establish a communication link with at least a second communication device. Accordingly, the scope of various aspects of the present invention should not be limited by characteristics of any particular type of second communication device, any particular type of communication link, or any particular manner of, or mechanism for, establishing a communication link.

Note that though the present discussion will, at times, generally refer to communication between the exemplary mobile communication device 200 and a second communication device, such a one-to-one correspondence is merely illustrative. The scope of various aspects of the present invention should not be limited by any particular number of communication devices with which the mobile communication device 200 may communicate.

The general communication control module 222, which will discussed below may, for example, utilize the first communication interface module 212 to receive voice communication information from the second communication device (e.g., over an established communication link). For example and without limitation, the general communication control module 222 may utilize the first communication interface module 212 to receive voice communication information corresponding to a second person utilizing the second communication device to speak to the user of the mobile communication device 200.

Also for example, the general communication control module 222 may, for example, utilize the user interface module(s) 230, which will be discussed below, to communicate at least a portion of the received voice information to the user (e.g., in a substantially silent manner from the perspective of people other than the user of the mobile communication device). For example, the general communication control module 222 may utilize the user interface module(s) 230 to generate an audio output corresponding to the received voice information at an ear speaker, earphone, headset or other audio output device such that the generated audio output may be presented to a user of the mobile communication device 200 without being audible to other people in the proximity of the mobile communication device 200. Such presentation of incoming voice information may provide voice information to a user of the mobile communication device 200 without causing noise interference to others.

As mentioned previously, the exemplary mobile communication device 200 may comprise one or more user interface module(s) 230. The user interface module(s) 230 may comprise characteristics of any of a large variety of user interfaces. For example and without limitation, the user interface module(s) 230 may share various functional characteristics with steps 115-120 of the exemplary method 100 illustrated in FIG. 1 and discussed previously.

For example, the user interface module(s) 230 may be adapted to receive a user input (e.g., from a person utilizing the mobile communication device 200 to communicate). The user input may comprise characteristics of any of a variety of user inputs. For example and without limitation, the user input may comprise a key press signal (e.g., associated with a key press on a numeric or alpha-numeric keypad). Also for example, the user input may comprise a signal indicative of a user touch screen selection. Further for example, the user input may comprise a signal indicative of cursor movement and/or selection (e.g., a touch pad, thumbwheel, arrow key, select button, etc.). The scope of various aspects of the present invention should not be limited by characteristics of a particular type of user input that may be received at a mobile communication device 200.

The user interface module(s) 230 may be adapted to receive a user input in any of a variety of manners. For example and without limitation, the user interface module(s) 230 may be adapted to passively receive an input from a user. Also for example, the user interface module(s) 230 may be adapted to actively solicit an input from a user. For example, the user interface module(s) 230 may be adapted to generate a visual output (e.g., a menu on a display) identifying a set of voice messages (e.g., as might be stored in the memory 240) from which the user may choose. Such voice messages may, for example, comprise prerecorded voice messages (e.g., characterized by a generic voice or the user's voice). For example, the prerecorded voice messages may correspond to a set of voice messages prerecorded by the user with the user's voice.

A menu of voice messages (e.g., a visual menu) may comprise characteristics of any of a variety of menu types. For example, a menu may comprise keywords or icons associated with particular words or voice messages. Also for example, a menu may comprise key letters, numbers or other symbols associated with particular words or voice messages. Such keywords, symbols, letters, numbers or other symbols may be a predefined set or may, for example, be definable (e.g., user selectable or designable).

In various non-limiting exemplary scenarios, the user interface module(s) 230 may be adapted to associate one of a plurality of sets of prerecorded voice messages (e.g., as might be stored in the memory 240) with a particular communication. For example, a first set of prerecorded voice messages may comprise messages recorded in a first language, and a second set of prerecorded voice messages may comprise messages recorded in a second language. In another example, a first set of prerecorded voice messages may comprise messages recorded for professional conversations, and a second set of prerecorded voice messages may comprise messages recorded for personal conversations. In yet another example, a first set of prerecorded messages may comprise messages recorded for conversations with a first person (or first group of people), and a second set of prerecorded messages may comprise messages recorded for conversations with a second person (or second group of people).

In a non-limiting exemplary scenario where there is such a plurality of sets of prerecorded voice messages (e.g., stored in the memory 240), the user interface module(s) 230 may be adapted to associate one of the plurality of sets of prerecorded voice messages with a particular communication in any of a variety of manners. For example and without limitation, the user interface module(s) 230 may be adapted to associate a set of prerecorded voice messages with a particular communication based, at least in part, on the identity of a second communication device (e.g., with which the mobile communication device 200 is presently communicating) or a user thereof. Also for example, the user interface module(s) 230 may be adapted to associate a set of prerecorded voice messages with a particular communication based, at least in part, on a user input indicating a user selection of a particular set. Further for example, the user interface module(s) 230 may be adapted to associate a set of prerecorded voice messages with a particular communication based, at least in part, on date, time, geographical location, present user of the mobile communication device 200, etc. In general, in various non-limiting exemplary scenarios, the user interface module(s) 230 may be adapted to associate one of a plurality of sets of prerecorded voice messages with a particular communication. Accordingly, the scope of various aspects of the present invention should not be limited by characteristics of any particular set of voice messages or any particular manner of associating a particular set of voice messages with a particular voice message.

In general, the user interface module(s) 230 may be adapted to receive a user input. Accordingly, the scope of various aspects of the present invention should not be limited by characteristics of any particular user input, any particular manner of (or mechanism for) receiving a user input or any particular manner of (or mechanism for) interacting with a user to receive a user input.

As discussed previously, the mobile communication device 200 may comprise a voice message generator module 224. The voice message generator module 224 may be adapted to determine and/or generate a voice message based, at least in part, on a user input (e.g., as received by the user interface module(s) 230). The voice message generator module 224 may, for example and without limitation, share various functional characteristics with steps 130 and 140 of the exemplary method 100 illustrated in FIG. 1 and discussed previously.

The voice message generator module 224 may be adapted to determine and/or generate a voice message in any of a variety of manners. For example and without limitation, the voice message generator module 224 may be adapted to select, based at least in part on a user input (e.g., as received by the user interface module(s) 230), a voice message from a set of voice messages (e.g., as might be stored in the memory 240). Such voice messages may, for example, comprise prerecorded voice messages (e.g., recorded in a generic voice or in the user's voice). As discussed previously with regard to step 130 of the exemplary method 100, a set of prerecorded voice messages may, for example, comprise a fundamental set of statements with which one side of a basic two-sided conversation may be conducted. For example and without limitation, a set of prerecorded voice messages may comprise statements, such as: "yes," "no," "maybe," "I can't talk now, but I'm listening," "I will call you as soon as I can," "I understand," "please leave a short message, to which I can respond with short prerecorded messages," "later," "tomorrow," "call someone else," "use your best judgment," "please hold while I move to a more appropriate location," "I have to hang up now," "please continue," "hello," "good-bye," "thank you," "please repeat," "please wait while a type an answer," etc.

The voice message generator module 224 may also, for example, be adapted to determine and/or generate a voice message by determining a voice message (or characteristics of a voice message) to synthesize based, at least in part, on a user input (e.g., as received by the user interface module(s) 230) and then synthesizing the determined voice message based. For example and without limitation, the voice message generator module 224 may be adapted to perform text-to-speech or phonics-to-speech synthesis, based on the user input. The user may, for example utilizing the user interface module(s) 230, spell a word or phrase or phonetically construct a pronunciation for a word or phrase, and the voice message generator module 224 may then be adapted to synthesize the word or phrase based, at least on part, on the input spelling or phonetic representation.

In a non-limiting exemplary scenario, the voice message generator module 224 may be adapted to generate an audio output (e.g., utilizing the user interface module(s) 230) indicative of the determined voice message. For example, the voice message generator module 224 may be adapted to present such an audio output to a user of the mobile communication device 200 through an ear speaker, earpiece, headset or other audio output device such that people in the proximity of the mobile communication device 200 will not hear the audio output, or in a manner that will be minimally affected by external sound noise at the user's locale. A user may thus hear the determined voice message. For example and without limitation, the voice message generator module 224 may be adapted to utilize the user interface module(s) 230 to generate an audio output corresponding to the determined voice message and provide the user an opportunity to affirm the determined voice message or specify that an alternative voice message be determined prior to the determined voice message being transmitted to the second communication device (e.g., by the first communication interface module 212, as discussed below). Also for example, the voice message generator module 224 may be adapted to generate an audio output of the determined voice message (e.g., utilizing the user interface module(s) 230) concurrently with the communication of the determined voice message (e.g., utilizing the first communication interface module 212) to the second communication device. In an exemplary scenario where the determined voice message is output to the user, the voice message generator module 224 may be adapted to mix the determined voice message with other audio that may be provided to the user by the user interface module 230 (e.g., audio associated with an incoming voice signal from the second communication device).

In general, the voice message generator module 224 may be adapted to determine and/or generate a voice message based, at least in part, on a user input (e.g., as received by the user interface module(s) 230). Accordingly, the scope of various aspects of the present invention should not be limited by characteristics of any particular manner of (or mechanism for) determining or generating a voice message (e.g., selecting or synthesizing a voice message) or any particular manner of (or mechanism for) providing feedback to a user to notify the user of a determined voice message.

As discussed previously, the mobile communication device 200 may comprise a general communication control module 222. The general communication control module 222 may generally manage communication of information between the user and another communication device (or a user thereof). For example and without limitation, the general communication control module 222 may share various functional characteristics with steps 110-140 of the exemplary method 100 illustrated in FIG. 1 and discussed previously.

For example, the general communication control module 222 may be adapted to utilize the user interface module 212 to communicate voice information (and/or other information) to and from a user of the mobile communication device 200.

Also for example, the general communication control module 222 may be adapted to utilize the first communication interface module 212 to communicate voice information (and/or other information) to and from another communication device.

For example, the general communication control module 222 may be adapted to utilize the first communication interface module 212 to communicate a determined voice message (e.g., as determined and/or generated by the voice message generator module 224) to the second communication device over an established communication link (e.g., as established by the first communication interface module 212). The general communication control module 222 may be adapted to utilize the first communication interface module 212 to communicate determined voice messages to the second communication device in any of a variety of manners (e.g., depending on the nature of the second communication device and/or the communication link established with the second communication device). As discussed previously, the second communication device may comprise characteristics of any of a variety of communication device types, and the communication link may comprise characteristics of any of a large variety of types of communication links. Accordingly, the scope of various aspects of the present invention should not be limited by characteristics of any particular manner of communicating a voice message.

As mentioned previously, the exemplary mobile communication device 200 may (e.g., optionally) comprise a second communication interface module 214 and additional communication interface modules, depending on the device configuration. Such a second communication interface module 214 may be identical to the first communication interface module 212 or may be different (e.g., adapted to communicate in a different manner). In a non-limiting exemplary scenario, the first communication interface module 212 may be adapted to communicate with another communication device over a telecommunication network, and the second communication interface module 214 may be adapted to communicate over a computer network. The scope of various aspects of the present invention should not be limited by the existence or non-existence of such a second communication interface module 214 or by characteristics of any particular type of communication interface module.

Also as mentioned previously, the exemplary mobile communication device 200 may comprise a memory 240. The memory 240 may, for example, be adapted to store prerecorded voice message information (e.g., information related to digital voice message sampling or information related to voice synthesis processing). The memory 240 may also, for example, be adapted to store software instructions, which may be executed by a processor of the mobile communication device 200. The memory 240 may comprise characteristics of any of a variety of memory types. Accordingly, the scope of various aspects of the present invention should not be limited by characteristics of any particular type of memory.

Additionally, for example and without limitation, the operational control module(s) 220 may be adapted to, in response to a particular user input, abort communicating a determined voice message to the second communication device. In a non-limiting exemplary scenario, a user may determine that an incorrect or unnecessarily long message is being communicated to another communication device and enter the particular user input to discontinue transmission of the errant or unnecessarily long message.

The exemplary mobile communication device 200 was presented to provide specific illustrations of various generally broader aspects of the present invention. Accordingly, the scope of various aspects of the present invention should not be limited by characteristics of the exemplary mobile communication device 200.

Figure 3:
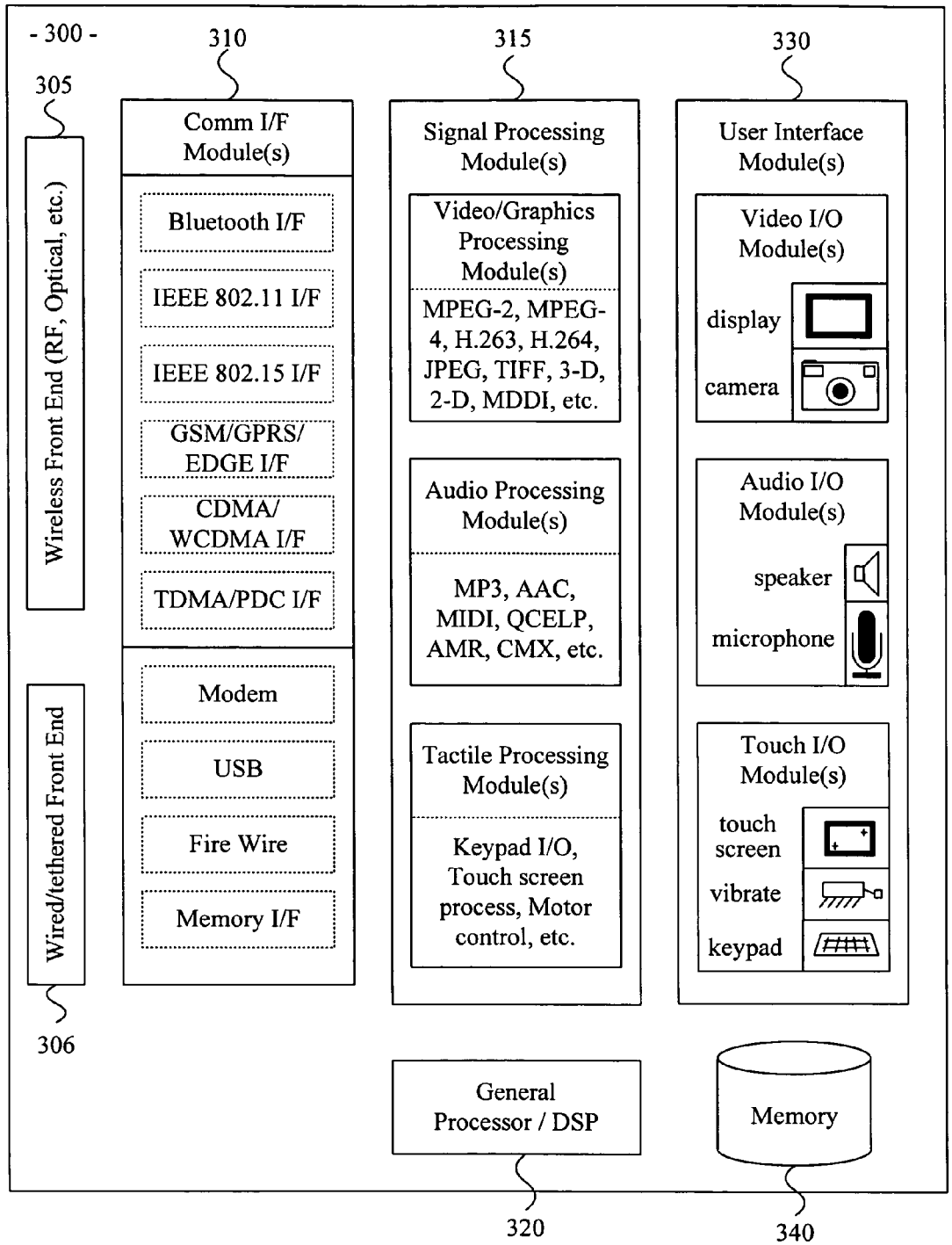
FIG. 3 is a diagram illustrating a non-limiting exemplary mobile communication device that provides silent conversation capability, in accordance with various aspects of the present invention.

FIG. 3 is a diagram illustrating a non-limiting exemplary mobile communication device 300 that provides silent conversation capability, in accordance with various aspects of the present invention. The exemplary mobile communication device 300 may, for example and without limitation, share various characteristics with the exemplary mobile communication device 200 illustrated in FIG. 2 and discussed previously. Further for example, the mobile communication device 300 may share various functional characteristics with the exemplary method 100 illustrated in FIG. 1 and discussed previously.

The exemplary mobile communication device 300 may comprise a wireless front end 305 and/or a wired/tethered front end 306. The wireless front end 305 and the wired/tethered front end 306 may be communicatively coupled to any of a variety of communication interface modules 310. The exemplary mobile communication device 300 is illustrated with a non-limiting exemplary set of communication interface modules 310, including: a Bluetooth interface module, IEEE 802.11 interface module, IEEE 802.15 interface module, GSM/GPRS/EDGE interface module, CDMA/WCDMA interface module, TDMA/PDC interface module, modem module, USB module, fire wire module and memory interface module (e.g., for interfacing with off-board or removable memory). The wireless front end 305, wired/tethered front end 306 and communication interface modules 310 may, for example and without limitation, share various characteristics with the communication interface module(s) 210 (e.g., including the first communication interface module 212 and the second communication interface module 214) of the exemplary mobile communication device 200 illustrated in FIG. 2 and discussed previously.

The exemplary mobile communication device 300 may also comprise any of a variety of user interface module(s) 330. The user interface module(s) 330 may, for example and without limitation, share various characteristics with the user interface module(s) 230 of the exemplary mobile communication device 200 illustrated in FIG. 2 and discussed previously. The exemplary mobile communication device 300 is illustrated with a non-limiting exemplary set of user interface module(s) 330 (or sub-modules). The user interface module (s) 330 may, for example, comprise any of a variety of video/graphics processing modules, audio processing modules, and tactile signal processing modules. The mobile communication device 300 may also comprise compatible user interface devices corresponding to the various user interface module(s) 330 (e.g., a video display, camera, speaker, microphone, touch screen, keypad, vibrator, etc.).

The exemplary mobile communication device 300 is illustrated with a non-limiting exemplary set of signal processing modules 315, which may be selectively utilized in accordance with current signal processing needs. The signal processing modules 315 may, for example, comprise various video, audio, textual and tactile signal-processing modules. The signal processing modules 315 may generally, for example, process information conveyed between the front ends 305, 306 and communication interface module(s) 310 of the mobile communication device 300 and the user interface module(s) 330 of the mobile communication device 300.

The exemplary mobile communication device 300 may also comprise a general processor 320 (and/or a digital signal processor) and on-board memory 340. The general processor 320, which may be a baseband processor for example, and memory 340 may perform any of a wide variety of operational tasks for the mobile communication device 300. For example and without limitation, the general processor 320 and memory 340 may share various characteristics with the operational control module(s) 220 and memory 240 of the exemplary mobile communication device 200 illustrated in FIG. 2 and discussed previously.

The exemplary mobile communication device 300 was presented to provide specific illustrations of various generally broader aspects of the present invention. Accordingly, the scope of various aspects of the present invention should not be limited by characteristics of the exemplary mobile communication device 300.

It should be noted that various modules of the previously discussed exemplary mobile communication devices 200, 300 may be implemented in hardware, software, or a combination thereof. Also, various modules may share portions of hardware and software. For example, a first and second module may share one or more hardware components and/or one or more software routines. Accordingly, the scope of various aspects of the present invention should not be limited by characteristics of any particular hardware or software implementation of the various modules or by arbitrary hardware and software boundaries between the various modules.

Further, the various modules of the exemplary mobile communication devices 200, 300 may be implemented in various degrees of integration. For example and without limitation, the modules may all be integrated on a single chip. Also for example, the various modules may be implemented in separate chips of a single circuit board. Accordingly, the scope of various aspects of the present invention should not be limited by characteristics of any particular implementation or level of integration of the various exemplary modules.

Figure 4:
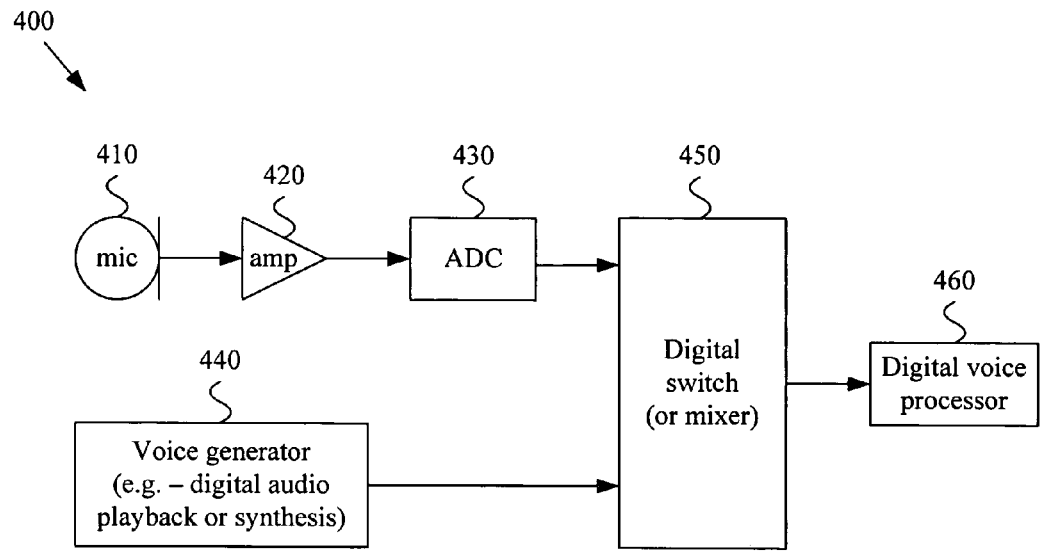
FIG. 4 is a diagram illustrating a non-limiting exemplary switching and/or mixing portion of a mobile communication device that provides silent conversation capability, in accordance with various aspects of the present invention.

FIG. 4 is a diagram illustrating a non-limiting exemplary switching and/or mixing portion 400 of a mobile communication device that provides silent conversation capability, in accordance with various aspects of the present invention. For example and without limitation, various components of the switching and/or mixing portion 400 may share various characteristics with components of the exemplary mobile communication device 200 illustrated in FIG. 2 and discussed previously.

For example, the microphone 410, amplifier 420 and analog-to-digital converter 430 (ADC) may share various characteristics with the user interface module(s) 230 of the exemplary mobile communication device 200. Also for example, the voice generator 440 may share various characteristics with the voice message generator module 224 of the exemplary mobile communication device 200. Further for example, the digital switch (or mixer) 450 and the digital voice processor 460 may share various characteristics with the general communication control module 222 of the exemplary mobile communication device 200.

In a non-limiting exemplary scenario, analog audio information may be generated by the microphone 410, amplified by the amplifier 420 and digitized by the ADC 430, thus presenting a digital audio signal to the digital switch (or mixer) 450. The voice generator 440 may (e.g., by playing back a prerecorded voice message or by synthesizing a voice message) generate a digital voice signal and provide the generated digital voice signal to the digital switch (or mixer) 450. In a first example, a digital switch 450 may select between the digital audio signal and the digital voice signal and pass the selected signal to the digital voice processor 460 for further processing (e.g., for communication to another communication device). In a second example, a digital mixer 450 may mix the digital audio signal and the digital voice signal and pass the mixed signal to the digital voice processor 460 for further processing (e.g., for communication to another communication device).

Figure 5:
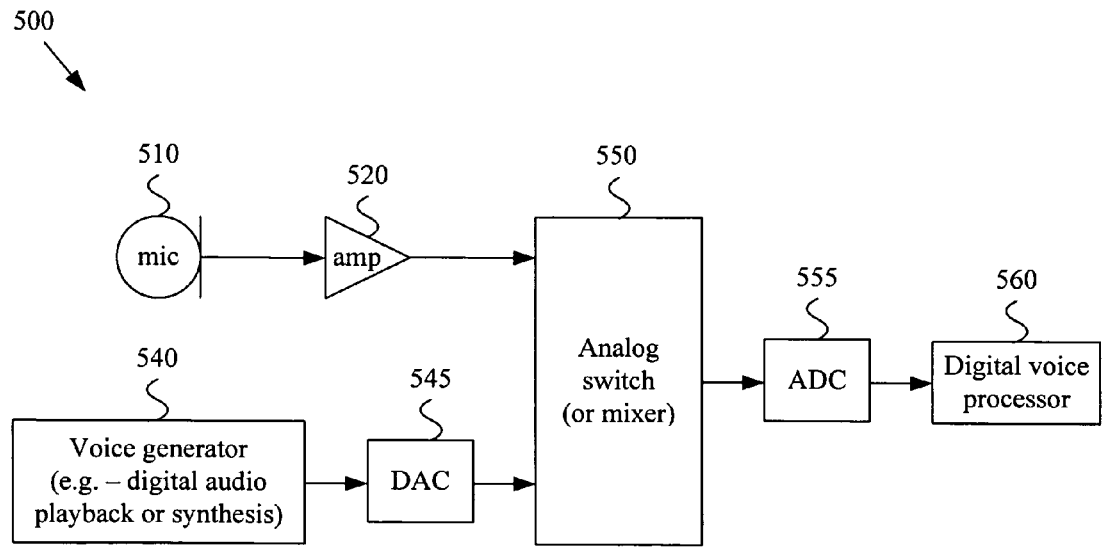
FIG. 5 is a diagram illustrating a non-limiting exemplary switching and/or mixing portion of a mobile communication device that provides silent conversation capability, in accordance with various aspects of the present invention.

FIG. 5 is a diagram illustrating a non-limiting exemplary switching and/or mixing portion 500 of a mobile communication device that provides silent conversation capability, in accordance with various aspects of the present invention. For example and without limitation, various components of the switching and/or mixing portion 500 may share various characteristics with components of the exemplary mobile communication device 200 illustrated in FIG. 2 and discussed previously.

For example, the microphone 510 and amplifier 520 may share various characteristics with the user interface module(s) 230 of the exemplary mobile communication device 200. Also for example, the voice generator 540 and digital-to-analog converter 545 (DAC) may share various characteristics with the voice message generator module 224 of the exemplary mobile communication device 200. Further for example, the analog switch (or mixer) 550, the ADC 555 and the digital voice processor 560 may share various characteristics with the general communication control module 222 of the exemplary mobile communication device 200.

In a non-limiting exemplary scenario, analog audio information may be generated by the microphone 510, amplified by the amplifier 520 and presented to the analog switch (or mixer) 550. The voice generator 540 may (e.g., by playing back a prerecorded voice message or by synthesizing a voice message) generate a digital voice signal, which is converted to an analog signal by the DAC 545 and passed to the analog switch (or mixer) 550. In a first example, an analog switch 550 may select between the analog audio signal and the analog voice signal, and the ADC 555 may digitize the selected analog signal and pass the digitized selected signal to the digital voice processor 560 for further processing (e.g., for communication to another communication device). In a second example, an analog mixer 450 may mix the analog audio signal and the analog voice signal, and the ADC 555 may digitize the mixed analog signal and pass the digitized mixed analog signal to the digital voice processor 560 for further processing (e.g., for communication to another communication device).

Figure 6:
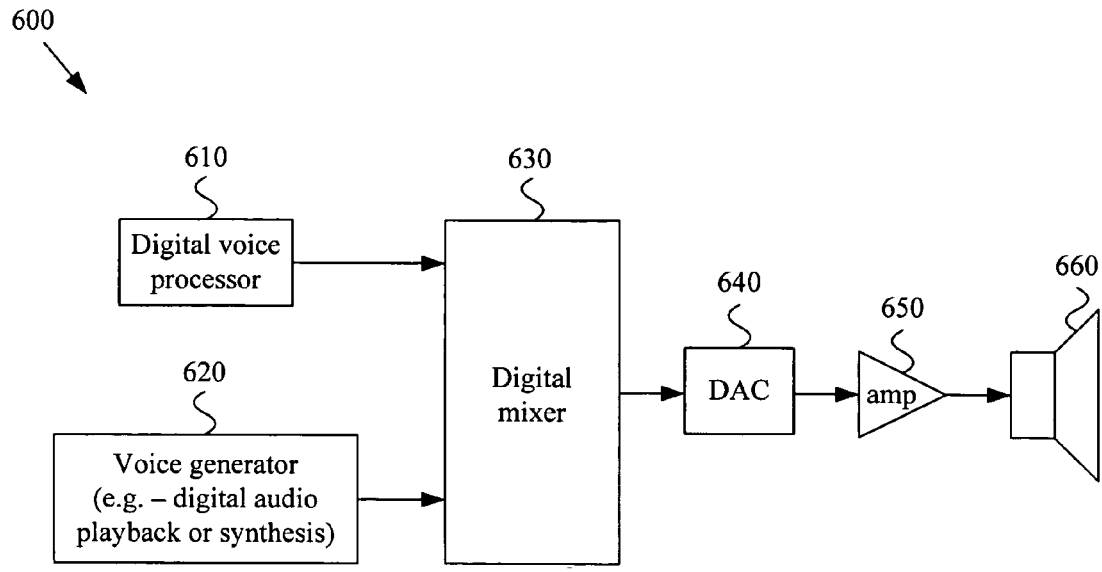
FIG. 6 is a diagram illustrating a non-limiting exemplary audio output portion of a mobile communication device that provides silent conversation capability, in accordance with various aspects of the present invention.

FIG. 6 is a diagram illustrating a non-limiting exemplary audio output portion 600 of a mobile communication device that provides silent conversation capability, in accordance with various aspects of the present invention. For example and without limitation, various components of the switching and/or mixing portion 600 may share various characteristics with components of the exemplary mobile communication device 200 illustrated in FIG. 2 and discussed previously.

For example, the digital voice processor 610 may share various characteristics with the general communication control module 222 of the exemplary mobile communication device 200. Also for example, the voice generator 620 may share various characteristics with the voice message generator module 224 of the exemplary mobile communication device 200. Further for example, the digital mixer 630 and DAC 640 may share various characteristics with the general communication control module 222 of the exemplary mobile communication device 200. Still further for example, the amplifier 650 and speaker 660 may share various characteristics with the user interface module(s) 230 of the exemplary mobile communication device 200.

In a non-limiting exemplary scenario, digital audio information may be received from another communication device, processed by the digital voice processor 610 and passed to the digital mixer 630. Additionally, the voice generator 620 may (e.g., by playing back a prerecorded voice message or by synthesizing a voice message) generate a digital voice signal, and pass the generated digital voice signal to the digital mixer 630. The digital mixer 630 may then, for example, mix the digital audio information and the digital voice signal and output the mixed digital signal to the DAC 640. The DAC 640 may then convert the mixed digital signal to a mixed analog signal, which is then amplified by the amplifier 650 and output to a user through the speaker 660.

Figure 7:
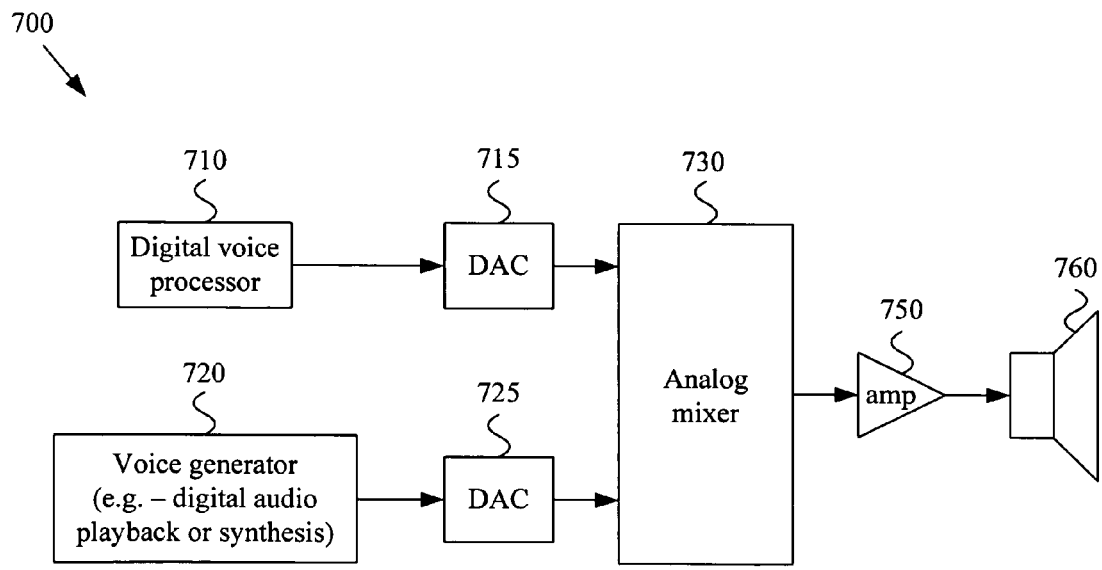
FIG. 7 is a diagram illustrating a non-limiting exemplary audio output portion of a mobile communication device that provides silent conversation capability, in accordance with various aspects of the present invention.

FIG. 7 is a diagram illustrating a non-limiting exemplary audio output portion 700 of a mobile communication device that provides silent conversation capability, in accordance with various aspects of the present invention. For example and without limitation, various components of the switching and/or mixing portion 700 may share various characteristics with components of the exemplary mobile communication device 200 illustrated in FIG. 2 and discussed previously.

For example, the digital voice processor 710 and DAC 715 may share various characteristics with the general communication control module 222 of the exemplary mobile communication device 200. Also for example, the voice generator 720 and the DAC 725 may share various characteristics with the voice message generator module 224 of the exemplary mobile communication device 200. Further for example, the analog mixer 730 may share various characteristics with the general communication control module 222 of the exemplary mobile communication device 200. Still further for example, the amplifier 750 and speaker 760 may share various characteristics with the user interface module(s) 230 of the exemplary mobile communication device 200.

In a non-limiting exemplary scenario, digital audio information may be received from another communication device, processed by the digital voice processor 710, converted to an analog audio signal by the DAC 715 and passed to the analog mixer 730. Additionally, the voice generator 720 may (e.g., by playing back a prerecorded voice message or by synthesizing a voice message) generate a digital voice signal, which is converted to an analog voice signal by the DAC 725 and passed to the analog mixer 730. The analog mixer 730 may then, for example, mix the analog audio information and the analog voice signal and output the mixed analog signal to the amplifier 750, which in turn outputs the amplified mixed analog signal to the speaker 760 for presentation to a user.

The exemplary mobile communication device portions 400, 500, 600 and 700 illustrated in FIGS. 4-7 were presented to provide specific illustrations of various generally broader aspects of the present invention. Accordingly, the scope of various aspects of the present invention should not be limited by characteristics of the exemplary mobile communication device portions 400, 500, 600 and 700.

In summary, various aspects of the present invention provide a system and method for providing silent conversation capability in a mobile communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a mobile communication device, a method for conducting a voice communication, the method comprising: establishing a wireless communication link with a second communication device; and
after the wireless communication link is established:
receiving a mode input;
enabling a silent communication mode based at least in part on the received mode input, wherein enabling the silent communication mode comprises switching from a non-silent communication mode and providing a visual output indicating a plurality of voice messages for selection;
receiving a user input responsive to the visual output indicating the plurality of voice messages for selection;
selecting, based at least in part on the received user input, a voice message from the plurality of voice messages; and
communicating the selected voice message to the second communication device over the established communication link.

2. The method of claim 1, wherein:
the mobile communication device comprises a cellular telephone; and
establishing a communication link with the second communication device comprises establishing a cellular communication link between the mobile communication device and the second communication device.

3. The method of claim 1, wherein receiving a user input comprises receiving a key press input.

4. The method of claim 1, wherein selecting a voice message comprises selecting, based at least in part on the user input, a voice message from a plurality of prerecorded voice messages.

5. The method of claim 4, wherein the plurality of prerecorded voice messages comprises prerecorded voice messages of the user's voice.

6. The method of claim 4, wherein the plurality of prerecorded voice messages comprises a fundamental set of statements with which one side of a two-sided conversation may be conducted.

7. The method of claim 1, wherein communicating the selected voice message comprises synthesizing the selected voice message based, at least in part, on the user input.

8. The method of claim 1, further comprising generating an audio output indicative of the selected voice message prior to communicating the selected voice message to the second communication device.

9. The method of claim 1, further comprising associating one of a plurality of sets of prerecorded voice messages with a particular communication.

10. The method of claim 1, further comprising:
receiving a second mode input; and
switching from the silent communication mode to the non-silent communication mode based, at least in part, on the second mode input.

11. The method of claim 10, wherein at least one of the mode input and the second mode input comprise a signal from the second communication device.

12. The method of claim 1, further comprising:
receiving a second user input; and
in response to the second user input, aborting communicating the selected voice message to the second communication device.

13. A mobile communication device, comprising:
a communication interface module adapted to establish a wireless communication link with a second communication device;
a user interface module adapted to receive at least:

a mode input adapted to enable a silent communication mode, and a user input; and at least one module, communicatively coupled to the communication interface module and the user interface module, that is adapted to:

utilize the communication interface module to establish a communication link with a second communication device;

switch from a non-silent communication mode to the silent communication mode and provide a visual output indicating a plurality of voice messages for selection based, at least in part, on the mode input received by the user interface module after the communication link is established;

select a voice message from a plurality of voice messages based, at least in part, on the user input received by the user interface module responsive to the visual output indicating the plurality of voice messages for selection after the communication link is established; and utilize the communication interface module to communicate the selected voice message to the second communication device over the established communication link.

14. The mobile communication device of claim 13, wherein:

the communication interface module comprises a cellular telephone transceiver module; and the communication link comprises a cellular telephone communication link.

15. The mobile communication device of claim 13, wherein the user input received by the user interface module comprises a key press input.

16. The mobile communication device of claim 13, further comprising a memory that stores a plurality of prerecorded voice messages, and wherein the at least one module is adapted to determine a voice message by selecting a voice message from the stored plurality of prerecorded voice messages based, at least in part, on the user input.

17. The mobile communication device of claim 16, wherein the plurality of prerecorded voice messages comprises prerecorded voice messages of the user's voice.

18. The mobile communication device of claim 16, wherein the plurality of prerecorded voice message comprises a fundamental set of statements with which one side of a two-sided conversation may be conducted.

19. The mobile communication device of claim 13, wherein the at least one module is further adapted to synthesize the selected voice message based, at least in part, on the user input.

20. The mobile communication device of claim 13, wherein the at least one module is further adapted to utilize the user interface module to generate an audio output indicative of the selected voice message prior to utilizing the communication interface module to communicate the selected voice message to the second communication device.

21. The mobile communication device of claim 13, further comprising a memory that stores a plurality of sets of prerecorded voice messages, and wherein the at least one module is adapted to associate one of a plurality of sets of prerecorded voice messages with a particular communication.

22. The mobile communication device of claim 13, wherein:

the user interface module is adapted to receive a second mode input; and the at least one module is adapted to switch from the silent communication mode to the non-silent communication mode based, at least in part, on the received second mode input.

23. The mobile communication device of claim 13, wherein:

the communication interface module is adapted to receive an operating mode signal; and the at least one module is adapted to switch between a silent and non-silent communication mode based, at least in part, on a received operating mode signal.

24. The mobile communication device of claim 13, wherein the at least one module comprises a switch circuit that is adapted to:

receive as input at least a first audio signal associated with a microphone of the mobile communication device and a second audio signal associated with the selected voice message;

generate a selected signal by, at least in part, selecting between the at least a first audio signal and the second audio signal; and output the selected signal.

25. The mobile communication device of claim 13, wherein the at least one module comprises a mixer circuit that is adapted to:

receive as input at least a first audio signal associated with a microphone of the mobile communication device and a second audio signal associated with the selected voice message;

generate a mixed signal by, at least in part, mixing the at least a first audio signal and the second audio signal; and output the mixed signal.

26. The mobile communication device of claim 13, wherein the at least one module comprises a mixer circuit that is adapted to:

receive as input at least a first audio signal associated with a voice message received by the mobile communication device and a second audio signal associated with the selected voice message;

generate a mixed signal by, at least in part, mixing the at least a first audio signal and the second audio signal; and output the mixed signal.

27. The mobile communication device of claim 13, wherein the at least one module is adapted to, in response to a second user input, abort communicating the selected voice message to the second communication device.

* * * * *